Dec. 26, 1933.         C. V. LITTON         1,940,870
                    METAL-TO-GLASS SEAL
                    Filed Sept. 15, 1930
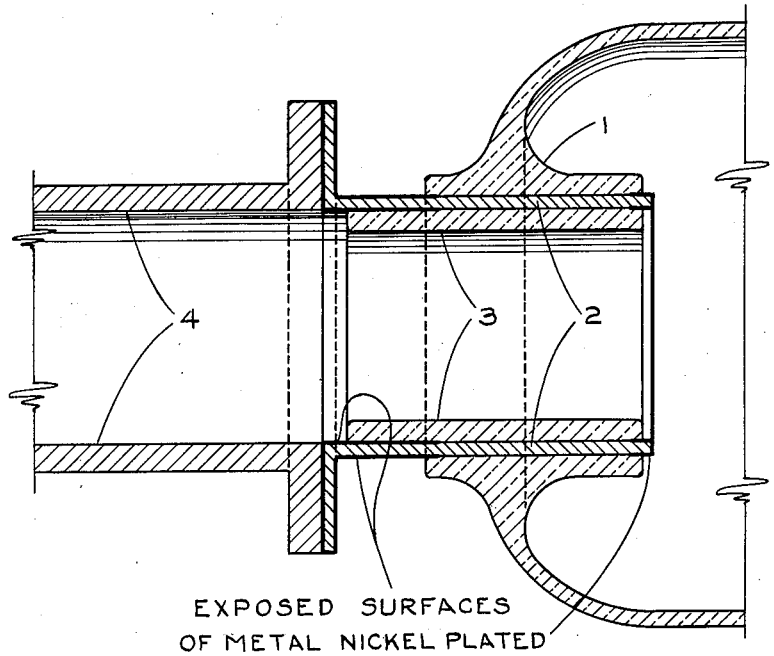
EXPOSED SURFACES
OF METAL NICKEL PLATED
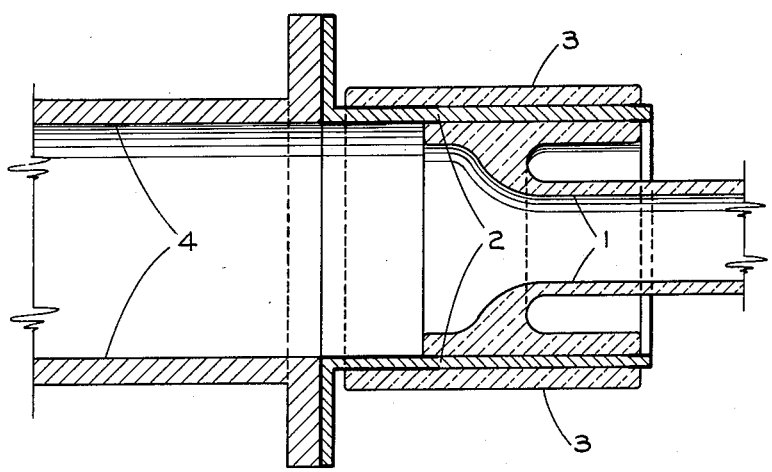
INVENTOR
CHARLES V. LITTON
BY
     ATTORNEY Patented Dec. 26, 1933

1,940,870

UNITED STATES PATENT OFFICE 1,940,870

METAL-TO-GLASS SEAL

Charles V. Litton, Redwood City, Calif., assignor to Federal Telegraph Company, San Francisco, Calif., a corporation of California Application September 15, 1930
Serial No. 481,932

3 Claims. (Cl. 250—27.5)

This invention relates to metal-to-glass seals and the art of making the same. It has to do more especially, though not exclusively, with metal-to-glass seals in devices such as high power vacuum tubes—and particularly seals of large or relatively large diameter.

The present invention is the outgrowth of a particularly difficult problem inherent in the production of high power vacuum tubes, wherein a part of the enclosing envelope is made of glass whilst the remaining part is of metal and constitutes the anode element. Structures of this character must of necessity be provided with a vacuum tight seal joining the metal and glass portions of the envelope; and it is with seals for that purpose that the present invention is mainly concerned—although it will be evident that the seals to be hereinafter described are not limited in their utility to that particular purpose.

The seals specifically referred to above are commonly known as "anode seals" because they serve to connect the glass portion of the envelope with that part thereof which constitutes the anode element of the tube. Such seals may be thus denominated hereinafter.

The principal difficulty with anode seals has been breakage caused by the forces of expansion and contraction. That is to say, differences of expansion and contraction between the metal and glass, accentuated by large and rapid temperature variations, tend to engender stresses which will either break the glass or rupture the weld. One way of avoiding anode seal breakage is to make the metal part of such extreme thinness and ductility that it will yield to those forces without rupturing the weld or breaking the glass. That expedient overcomes the one difficulty but gives rise to another, namely: that the mechanical strength of the tube is seriously impaired. A large power tube has considerable weight and must withstand shipment and sometimes rough handling. And what is more, such tubes are quite expensive. Hence, the importance of providing an anode seal of ample mechanical strength will be apparent. That, together with the provision of a seal that can be conveniently and economically produced, constitutes the principal object of the present invention.

The kind of seals with which this invention is concerned are of the tubular "lap-joined" or "lap-weld" type—those terms being synonymous and intended to distinguish from seals of the so-called "fork" type and other types which are more or less obviously not in the same category. An example from the prior art of what is here termed a "lap-joined" or "lap-weld" anode seal is disclosed in United States patent to Housekeeper No. 1,560,690.

Seals of the "lap-joined" type as disclosed in the prior art appear to be totally impracticable as anode seals, although quite practicable for other purposes. If it were not for inexorable limitations as to the kinds of glass and metals capable of being used, a "lap-joined" seal of the ordinary type could probably be made to serve the purpose very satisfactorily. But unfortunately the tube designer cannot select his materials purely on the basis of their coefficients of expansion and other factors vital only to the seal itself. The glass and metal selected must be capable of forming a strong weld, and the glass must have certain properties essential to its use in a vacuum tube. Likewise the metal selected must have suitable properties in addition to being "wettable" by the glass.

If sufficiently thin metal were employed, an anode seal of the "lap-joined" type could doubtless be made, which, purely as a seal, would meet all requirements. That is to say, it would probably not rupture under the forces of contraction and expansion—but it would not be acceptable because of its deficiencies in other respects.

The present invention overcomes the deficiencies referred to in that it permits the making of a "lap-joined" anode seal with metal of substantial thickness. This is accomplished through the use of what will be termed a reinforcing element, or, more specifically, a "reinforcing ring", the function of which is to counteract in part the tendency of the metal to expand and contract, thereby relieving the main weld of the seal, and likewise the glass element of the seal, of the excessive stresses which would otherwise result in breakage. From this point on, the invention can be best described by reference to the accompanying drawing wherein:

Fig. 1 is a longitudinal sectional view through an anode seal wherein the glass element of the seal is welded to the exterior surface of a metal tube—the latter forming the metal element of the seal.

Fig. 2 is a similar showing of an alternative seal design wherein the glass element is welded to the interior surface of the metal tube.

In each of the two figures, 1 indicates the glass element, tubular in form, which is sealed, that is, welded to a metal tubular element 2. Element 2, together with that part of element 1 which is joined thereto, may be considered as forming the seal per se. In each instance there is shown a reinforcing element in the form of a ring 3. In the structure of Fig. 1 the ring 3 is inside the metal tube 2, while in Fig. 2 it is disposed outside.

The metal tube 2 should be quite thin—that is, as thin as practical considerations permit. But as previously indicated it does not need to be so thin that its mechanical strength is unduly impaired. The thickness of the metal is of the order of a few thousandths of an inch. Tubes ranging in thickness from seven thousandths to fifty thousandths of an inch have been used.

In each instance, the reinforcing ring is welded to the metal tube—this operation preferably being performed concurrently with the welding to the metal of the glass element 1.

The reinforcing ring 3 is, in general, made of glass having suitable properties, but there is no reason to suppose that other materials than glass would not serve the purpose, as for example, porcelain. Hence in referring to glass, it is intended that equivalent materials, such as porcelain, be included. The same applies to the tubular glass element 1, which obviously might be made of other materials such as porcelain.

It has been stated that the reinforcing ring is welded to the metal tube, but since the weld in that case serves only as an anchoring means, it becomes evident that there may be other suitable expedients, such as mechanical anchoring. That does not hold true, however, of the joint between elements 1 and 2. That joint must be absolutely air tight.

The element 3 has been shown and referred to as a ring, but that obviously must be regarded as a generic term. The reinforcing element may take numerous forms, such as that of a disc or a spider, and it is not necessarily continuous at the periphery.

The reinforcing ring 3 is, in each instance, disposed in contraposition to the weld between elements 1 and 2. By that term is meant that the reinforcing ring is directly opposite the weld referred to, instead of being at some position substantially out of line with that weld.

Now as to the composition of the elements 1, 2 and 3, no exact specifications can be given which would be applicable to all cases. In making a choice of materials, one must frequently be guided by factors having no direct bearing on the seal itself. For example, one may be limited as to choice of glasses due to the temperatures which have to be taken into account and because it may have to meet other requirements peculiar to the particular case. Likewise, it is necessary to choose a metal having desirable characteristics in all necessary respects as well as being wettable. Similar considerations of course apply to the reinforcing ring.

Having determined what materials may be usable, it is desirable to select glass and metal for elements 1 and 2 respectively having as nearly as possible equal coefficients of expansion, thus reducing to a minimum the forces of expansion and contraction likely to be developed. The material out of which the reinforcing ring 3 is made should be selected with a view to obtaining expansion and contraction therein such as to offset the tendency of the metal element to expand and contract excessively. Thus if the glass of element 1, Fig. 1, has a lower coefficient of expansion than that of the metal of element 2, the coefficient of expansion of the reinforcing ring should be less than that of the metal. But it does not follow as a matter of course that the reinforcing ring should be made of the same kind of glass as that of the element 1. In some cases a different kind of glass will work to advantage. It is not only the coefficient of expansion which need be taken into account, but there should also be considered the temperatures to which the parts may be subjected and also the strength of the weld between the metal and the different glasses.

When the reinforcing ring is inside as in Fig. 1, where the temperature may rise more rapidly or reach a higher point than that of the element 1, it is likely to be desirable to use a glass having a lower coefficient of expansion. The converse might be true with respect to the seal shown in Fig. 2.

From what has been said, it is manifest there is much occasion for the exercise of good judgment and engineering ability in the designing of a seal of this kind, and furthermore that it may be unavoidably necessary to experiment before an entirely suitable design to meet the needs of any particular case can be arrived at.

For vacuum tube anode seals such as those to which particular reference has been made, pure copper is recommended for the metal element 2. The purity of the copper is quite vital, and likewise its freedom from defects such as blowholes. Since the metal is necessarily quite thin, blow holes may be disastrous. Likewise, the presence of oxides in the copper may be severely detrimental. Copper of suitable purity and freedom from blow holes may be produced by first melting in an atmosphere of hydrogen for reducing the oxides and thereafter melting under vacuum for removing occluded gases. In practice, it has been found necessary to resort to these expedients in order to avoid an excessive number of failures. A defective seal may not be detectable until the vacuum tube is completed and put in operation. It is much more economical to take all possible precautions against failure than to have them develop after the tube is completed.

From the information already given, those skilled in the art should have no more difficulty than should normally be expected in producing a satisfactory seal in accordance with the present invention, but for the sake of completeness of disclosure some specific examples of successful anode seals will be given. One such seal approximately in accordance with Fig. 1 was two inches in diameter at the weld. The element 2 was of copper tubing made as before described and .009″ thick. The flange of element 1 was $\frac{1}{16}$″ thick and $\frac{3}{8}$″ wide. The reinforcing ring 3 was of like dimensions. Elements 1 and 3 were made of the same kind of glass having a coefficient of expansion of .0362 x $10^{-4}$ per degree centigrade.

Other successful seals have been made with copper tubing as thick as .040″. In these cases, the outside glass had a coefficient of expansion of .0362 x $10^{-4}$ per degree centigrade, while the inside glass had a coefficient of expansion of .034 x $10^{-4}$ per degree centigrade. The latter seals were also of 2″ diameter.

As a measure of precaution against oxidation occurring during the welding operation, it is very desirable to nickel plate those surfaces of element 2 which are not to be covered by the glass, and, in addition, a small margin in each instance that is to be covered by the glass. The glass will not adhere as firmly to the nickel as it does to the copper, but it makes an unsatisfactory weld with an oxidized copper surface because the oxide itself does not adhere very firmly to the metal. Thus it is obviously preferable to have a small part of the metal surfaces to which the welds are to be made nickel plated.

It is not essential that the element 1 be made entirely of one kind of glass. The flange portion thereof may be made of one kind of glass and the remainder of another kind, if so desired. It will be noted that the flange part of element 1 taken by itself is a glass tube. This may be and is preferably attached to the element 2 independently of the remainder of the element 1. It is much more convenient to make the seal without having to handle a bulky glass envelope.

In each of the figures there is shown an element 4. This represents the metal anode which forms a part of the envelope of a vacuum tube of the high power type. The anode 4 forms no part of the present invention, since the invention resides in the seal, per se, which is not primarily concerned as to the nature of the device in which it may be incorporated.

I claim:

1. A vacuum tube seal comprising a copper cylindrical shell, an insulating cylindrical shell member welded to one surface of said copper shell, and a second insulating cylindrical shell member welded to the other surface of said copper shell, said members being independent of each other, out of contact with the ends of said copper shell and co-axial therewith.

2. A vacuum tube seal comprising a copper cylindrical shell, an insulating cylindrical shell member welded to one surface of said copper shell over a portion removed from its edges, and a second insulating cylindrical shell member welded to the other surface of said copper shell and also removed from its edges, said members having a coefficient of expansion differing from that of the copper shell and conjointly restricting the expansion of said shell.

3. A seal in accordance with claim 6 characterized by the fact that said members contact said copper shell over unequal surface areas one of which is completely super-imposed upon the other.

CHARLES V. LITTON.